US008094328B2

(12) United States Patent
Ryu et al.

(10) Patent No.: US 8,094,328 B2
(45) Date of Patent: Jan. 10, 2012

(54) IMAGE FORMING APPARATUS AND METHOD OF CONTROLLING THE SAME

(75) Inventors: Sung Hyun Ryu, Seoul (KR); Jae Ho Kim, Suwon-si (KR); Sook Hyun Kong, Hwaseong-si (KR); Eun Young Jung, Suwon-si (KR); Won Young Chi, Suwon-si (KR); Yoon Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1063 days.

(21) Appl. No.: 11/954,047

(22) Filed: Dec. 11, 2007

(65) Prior Publication Data

US 2008/0137127 A1 Jun. 12, 2008

(30) Foreign Application Priority Data

Dec. 12, 2006 (KR) .................. 10-2006-0126383

(51) Int. Cl.
*G06F 15/00* (2006.01)
*G06F 15/16* (2006.01)
(52) U.S. Cl. ...................... 358/1.14; 709/203
(58) Field of Classification Search ............... 358/1.14, 358/1.13, 1.15, 1.12, 1.16, 1.18, 1.1, 1.9; 382/218, 100; 399/366, 15, 81, 821; 709/203, 709/219, 223; 715/747, 744, 788, 273, 713
See application file for complete search history.

(56) References Cited

U.S. PATENT DOCUMENTS

| | | | |
|---|---|---|---|
| 5,629,990 A | 5/1997 | Tsuji et al. | |
| 6,272,248 B1 * | 8/2001 | Saitoh et al. | ............. 382/218 |
| 7,002,710 B1 | 2/2006 | Van Liew et al. | |
| 2004/0199862 A1 | 10/2004 | Kobayasi et al. | |

FOREIGN PATENT DOCUMENTS

| | | |
|---|---|---|
| EP | 0 535 891 A2 | 4/1993 |
| EP | 0 629 926 A2 | 12/1994 |
| EP | 1 024 414 A1 | 8/2000 |
| JP | 06-70149 | 3/1994 |

OTHER PUBLICATIONS

European Search Report dated Mar. 14, 2008, regarding application No. 07122908.2-2202.

* cited by examiner

*Primary Examiner* — Saeid Ebrahimi Dehkordy
(74) *Attorney, Agent, or Firm* — Stanzione & Kim, LLP

(57) ABSTRACT

An image forming apparatus and a method to control the same. The image forming apparatus determines whether the object to be printed is real money. If the object is real money, the image forming apparatus prints a variety of counterfeit money discrimination information (e.g., the counterfeit money preventing pattern, the warning message, or the unique number of the image forming apparatus used for printing the money) on the back side of the copy of the money, and prints the original image of the money on the front side of the copy of the money without any change. Therefore, the image forming apparatus can color-print the original image of the money without any change, and can prevent the copied money from being used as counterfeit money.

15 Claims, 8 Drawing Sheets

<FRONT>　　　　　　　　　<BACK>

IMAGE FORMING APPARATUS AND METHOD OF CONTROLLING THE SAME

CROSS-REFERENCE TO RELATED APPLICATIONS

This application claims the benefit of Korean Patent Application No. 2006-0126383, filed on Dec. 12, 2006 in the Korean Intellectual Property Office, the disclosure of which is incorporated herein by reference in its entirety.

BACKGROUND OF THE INVENTION

1. Field of the Invention

The present invention relates to an image forming apparatus, and more particularly to an image forming apparatus to support a money discrimination function capable of determining whether a reading object to be printed is money or another type of object.

2. Description of the Related Art

In general, a color-type image forming device based on an electronic-photo scheme scans an optical signal to a photosensitive medium charged with a predetermined electric potential, such that it forms an electrostatic latent image. This electrostatic latent image is developed with four toners (i.e., yellow, magenta, cyan, and black toners). The developed image is copied on a paper, such that a desired color image can be acquired.

The image forming apparatus has a scan function, such that it scans the color image with a scanner and outputs the color image using the scan function.

Recently, since a performance of the image forming apparatus increases, the possibility of generating a fraudulent user who scans real money or securities with a scanner to create counterfeit money is rapidly increasing.

In order to prevent the above-mentioned problems from being generated, the image forming apparatus has a money discrimination function to determine whether an object to be discriminated is money or not. The image forming apparatus equipped with the money discrimination function stops printing if it is determined that the object is money, or prints the image of the object in the form of a black-and-white image. Also, the image forming apparatus modifies the size of the original image of the money into another size, or prints a unique number on the printed money.

However, if the user desires to view a color copy of the money without the intention of fraudulently using the copy of the money as counterfeit money, it is impossible to color-print the money using the conventional image forming apparatus, or the original image of the money may be modified into an undesired image, resulting in greater inconvenience of use.

SUMMARY OF THE INVENTION

The present general inventive concept provides an image forming apparatus capable of color-printing an original image of money without any change, and preventing the copy of the money from being used as counterfeit money, and a method of controlling the same.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept can be achieved by the provision of a method of controlling an image forming apparatus including: determining whether an object to be printed is money; if the object is determined to be money, switching to a double-sided printing mode; and during the double-sided printing mode, printing counterfeit-money discrimination information on one side of a paper, and printing an image of the money on the other side of the paper.

The printing operation may include: firstly performing a printing process on a specific side selected from among front and back sides of the paper, in which the specific side includes the counterfeit-money discrimination information.

The printing operation may include: printing an original image of the money without any change in size.

The printing operation may include: sequentially printing the counterfeit-money discrimination information and the image of the money.

The money can be indicative of a bill, a check, paper money, or a security.

The counterfeit-money discrimination information can be indicative of either a predetermined counterfeit-money preventing pattern, a warning message, and a unique number of the image forming apparatus used for the printing, or can indicative of a combination of the counterfeit money preventing pattern, the warning message, and the unique number of the image forming apparatus.

The foregoing and/or other aspects and utilities of the present incentive concept may be achieved by providing an image forming apparatus including: a discrimination unit to determine whether an object to be printed is money; a printing unit to print data, and output the printed data; and a controller to control operations of the printing unit if the object to be printed is the money, such that the printing mode is switched to the double-sided printing mode when the object is indicative of the money, counterfeit-money discrimination information is printed on either a front side or a back side of a paper, and then an image of the money is printed on the other side of the paper in such a way that the counterfeit-money discrimination information and the money image are sequentially printed on the paper.

The money can be indicative of a bill, a check, paper money, or a security.

The counterfeit-money discrimination information can be indicative of either a counterfeit-money preventing pattern indicating that a copied money is counterfeit money, a warning message, and a unique number of the image forming apparatus used for the printing, or can be indicative of a combination of the counterfeit money preventing pattern, the warning message, and the unique number of the image forming apparatus.

The controller can perform a printing process on a specific side selected from among front and back sides of the paper, in which the specific side includes the counterfeit-money discrimination information.

The controller can print an original image of the money without any change in size.

The controller can sequentially print the counterfeit-money discrimination information and the image of the money.

The foregoing and/or other aspects and utilities of the present incentive concept also may be achieved by providing a counterfeit determination apparatus, including a discrimination unit to determine whether an object to be printed is money or another type of object; and a controller to control operations of reproducing the object if the object is determined to be money, such that a reproducing mode is switched to the double-sided reproducing mode when the object is indicative of money, counterfeit-money discrimination information is provided on either a front side or a back side of a reproduced image, and then an image of the money is printed on the other side of the reproduced image in such a way that the counterfeit-money discrimination information and the money image are sequentially provided on the reproduced image.

The counterfeit determination apparatus may include a printing unit to print data such that the reproduced image by the controller is reproduced on a recording medium. Alternatively, the reproduced image may be reproduced on a display.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
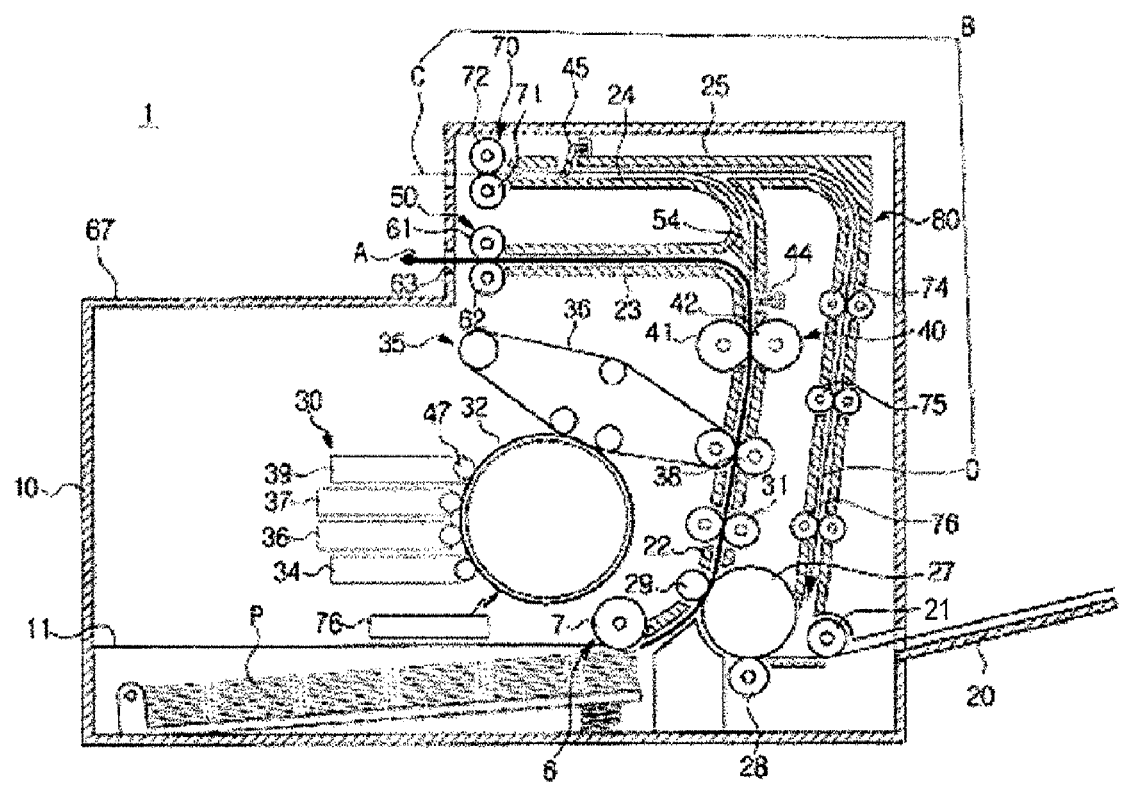
FIG. 1 is a schematic diagram illustrating an image forming apparatus according to an embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a schematic diagram illustrating an image forming apparatus according to an embodiment of the present general inventive concept.

Referring to FIG. 1, the image forming apparatus 1 according to the embodiment of FIG. 1 includes: a paper-supply (or other type of recording medium) cassette 11 detachably connected to a frame 10 of a main body; a pickup/transfer unit 6 to pick a paper P from the paper-supply cassette 11, and to transfer the paper P; an image forming unit 30 to allow a yellow-toner image, a magenta-toner image, a cyan-toner image, and a block-toner image to overlap on a photo-conductor 32; a copy unit 35 to copy the toner images formed on the photo-conductor 32 on the paper P; a fixing unit 40 to apply heat and pressure to the toner images formed on the paper P to fix the toner images; a paper-discharge unit 50 to discharge the paper P on which the toner images are fixed by the fixing unit 40; and a both-side printing unit 80 to allow the paper P, one side of which includes the fixed toner images, to re-enter the copy unit 35 and the fixing unit 40 to copy a desired image on the other side of the paper P.

In the case of the printing process of the image forming apparatus having the above-mentioned configuration, the paper P loaded on the paper-supply cassette 11 or the manual paper-supply part 20 is picked up by a first pickup roller 7 or a second pickup roller 21, and is transferred to the copy unit 35 along a transfer guide frame 22 by first and second transfer rollers 27 and 31 respectively.

While the paper P is transferred to the copy unit 35, an electrostatic latent image is formed on the photo-conductor 32 by a laser beam emitted from a laser scanning unit (LSU) 76 according to the image signal. The electrostatic latent image formed on the photo-conductor 32 contains toners by developing rollers 47 of developing machines 34, 36, 37 and 39, such that the resultant image including the toners is developed as a toner image.

The toner image formed on the photo-conductor 32 is copied onto the image-copying belt 36 of the copy unit 35. Thereafter, when the paper P is transferred to the copy unit 35 along a transfer guide frame 22, the toner image is copied onto a single side of the paper P (e.g., a first side of the paper P) by a copy roller 38. The toner image copied on the first side of the paper P is fixed on the first side of the paper P by a heating roller 41 and a pressing roller 42 contained in the fixing unit 40.

The paper P discharged from the heating/pressing rollers 41 and 42 switches at a paper sensor 44 located at a downstream of the paper-transferring direction of the pressing roller 42. In this case, an image forming controller to control overall operations of the image forming apparatus 1 determines whether the printing mode of the image forming apparatus is a single-sided printing mode or a double-sided printing mode. If the single-sided printing mode is determined, the image forming controller switches a paper-transfer-direction switching part 54 to a first position to block a paper-reverse path C of a double-sided printing path B. As a result, the paper P is directed to a paper-discharge path A along the paper-discharge guide frame 23 by the paper-transfer direction switching part 54, such that it is discharged to a paper-discharging part 67 via a paper-discharge roller 62 and the paper-discharge backup roller 61 contained in a paper-discharge unit 60.

In the meantime, if the double-sided printing mode is determined, the controller switches the paper-transfer direction switching part 54 to a second location to block the paper-discharge path A. As a result, the paper P is directed to the paper-reverse path C along a reverse guide frame 24, such that the paper P is transferred to a reverse roller 71 and a reverse backup roller 72 contained in a paper-reverse unit 70 along the paper-reverse path C. If the paper arrives within the vicinity of the reverse roller 71 and the reverse backup roller 72, the reverse sensor 45 is switched on by the paper P, and is then switched off when the rear part of the paper P passes through the reverse sensor 45. If the reverse sensor 45 is switched off, the controller allows the reverse roller 71 to be rotated in a reverse direction. As a result, the paper P is not discharged to the outside of the image forming apparatus, and enters a reverse-transfer guide frame 25 forming the paper-reverse transfer path D of the double-sided printing path B.

The paper P entering the reverse transfer guide frame 25 passes through the first and second transfer rollers 27 and 31 by way of the paper-reverse transfer path D after passing through the first, second, and third reverse transfer rollers 74, 75, and 76, and is then transferred to the copy unit 35. The back side of the paper P passes through the paper sensor 44 via the above-mentioned printing process, such that the paper sensor 44 is switched on. In this case, the controller switches the paper-transfer-direction switching part 54 to the first position to block the paper-reverse path C because the paper sensor 44 is switched on. As a result, the paper is directed to the paper-discharge path A along the paper-discharge guide frame 23 by the paper-transfer-direction switching part 54, such that it is discharged to the paper-discharge part 67 via a paper-discharge roller 62 and the paper-discharge backup roller 61 of a paper-discharge unit 60.

Figure 2:
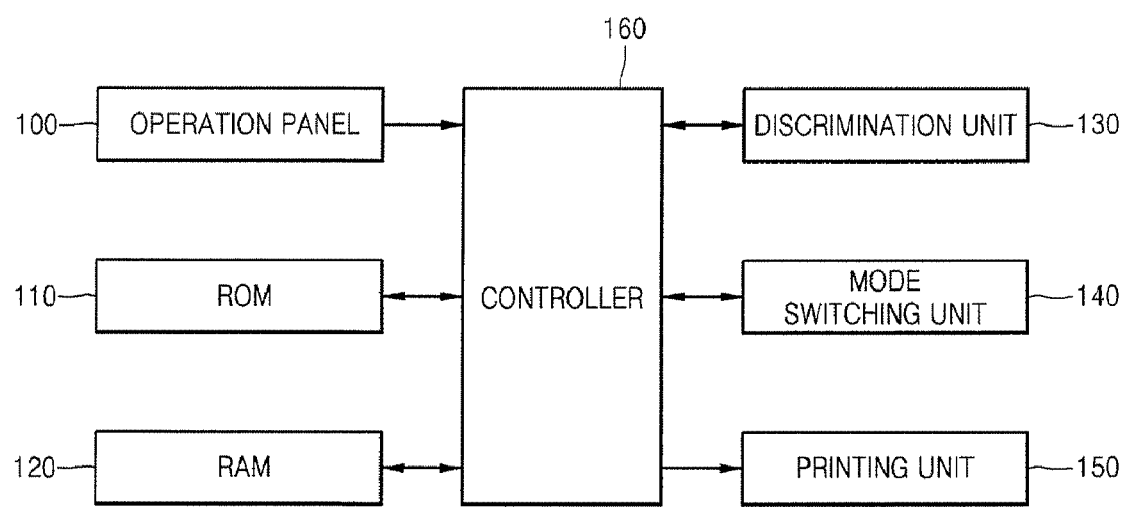
FIG. 2 is a block diagram illustrating an image forming apparatus according to an embodiment of the present general inventive concept.

FIG. 2 is a block diagram illustrating an image forming apparatus according to an embodiment of the present general inventive concept. Referring to FIG. 2, the image forming apparatus according to the present embodiment includes an operation panel 100, a ROM (Read Only Memory) 110, a RAM (Random Access memory) 120, a discrimination unit 130, a mode switching unit 140, a printing unit 150, and an controller 160.

The operation panel 100 includes an operation panel and an LCD panel. A user command received from the operation panel 100 is transmitted to the controller 160, and status information of the image forming apparatus is displayed on the LCD panel according to a control signal of the controller 160.

The ROM 110 serving as a nonvolatile memory maintains its data even when the image forming apparatus is powered off. The ROM 110 includes a control program such as an OS (Operating System) required for implementing a variety of functions of the image forming apparatus and a money discrimination program, etc.

The RAM 120 serving as a volatile memory stores a variety of data generated while corresponding programs are executed.

The discrimination unit 130 determines whether an object to be discriminated is money (e.g., securities, bills, checks, or paper-money) or another type of object. In other words, the discrimination unit 130 optically scans the object to determine whether the object is money.

Generally, the discrimination unit 130 determines whether the object is money according to an optical transmission scheme based on a visible- or infrared-ray. In more detail, the discrimination unit 130 can determine whether the object is money using a variety of optical schemes (e.g., a general optical scheme, a special optical scheme, and an ultraviolet (UV) scheme based on an UV pattern.

The mode switching unit 140 switches a printing mode from a single-sided printing mode to a double-sided printing mode according to a control signal of the controller 160.

The printing unit 150 prints printing data on the paper according to a control signal of the controller 160.

The controller 160 controls overall operations of the image forming apparatus.

Figure 3:
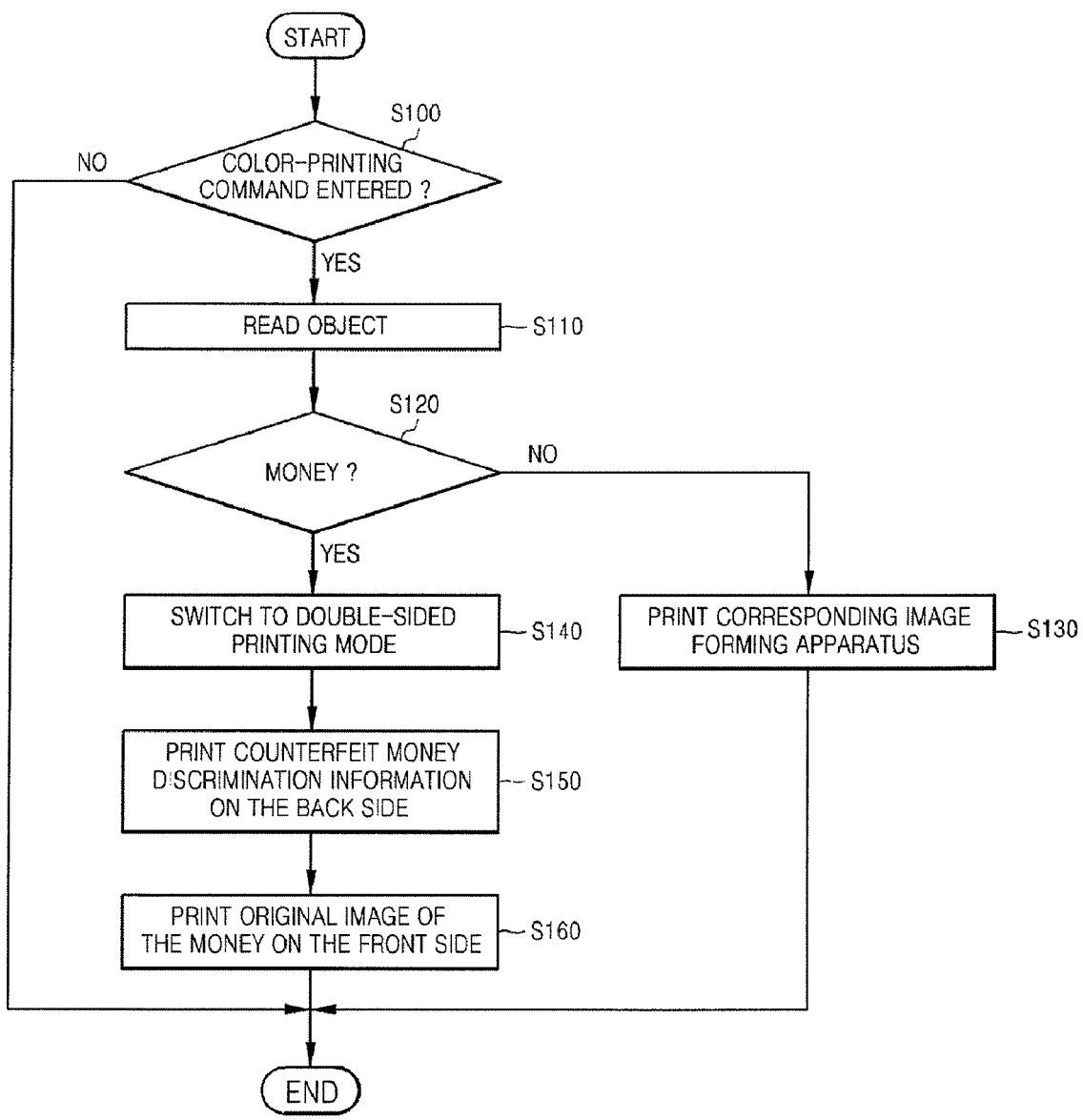
FIG. 3 is a flow chart illustrating a method of controlling the image forming apparatus according to FIG. 1.

FIG. 3 is a flow chart illustrating a method of controlling the image forming apparatus according to an embodiment of the present general inventive concept. Referring to FIG. 3, a user puts the money to be discriminated on the scanner, and presses a color-printing button.

Upon receiving the color-printing command from the operation panel 210 at operation S100, the controller 160 performs an object recognition algorithm, and discriminates the object via the discrimination unit 130. The controller 160 determines whether the object is money by referring to the discrimination result at operation S120. If the object is determined not to be money at operation S120, the controller 160 prints a corresponding image using the printing unit 250 at operation S130.

If the object is determined to be money at operation S120, the controller 160 switches a current printing mode of the mode switching unit 140 to a double-sided printing mode (also called a duplex printing mode) at operation S140, such that a copy of money can be printed on both sides of the paper.

The back side of the money is firstly printed by the printing unit 150 at operation S150. In this case, a variety of counterfeit-money discrimination information is printed on the back side of the copy, for example, a counterfeit-money discrimination pattern denoted by an oblique-lined part, a warning message indicating the printing of the money, and a unique number of the image forming apparatus. The unique number of the image forming apparatus is used to determine whether the image forming apparatus has copied the money. The unique number of the image forming apparatus and the warning message are printed on the back side of the copy. The above-mentioned counterfeit-money discrimination information is printed at the same location as that of the front image of the money, such that the corresponding copied money cannot be used as real money and people can easily recognize that the corresponding money is a counterfeit copy.

If the back-side printing of the copy is completed, the image forming apparatus prints the original image of the corresponding money on the front side of the copy without any change at operation S160. The reason why the printing action is executed in the order from the back-side printing to the front-side printing is to prevent the user from powering off the image forming apparatus when the front-side printing is completed, and to prevent the user from compulsorily drawing the paper from the image forming apparatus at a specific time at which the back-side printing begins.

If the money is determined to be paper money, the printing result of the paper money will hereinafter be described with reference to FIGS. 4 to 8.

Figure 4:
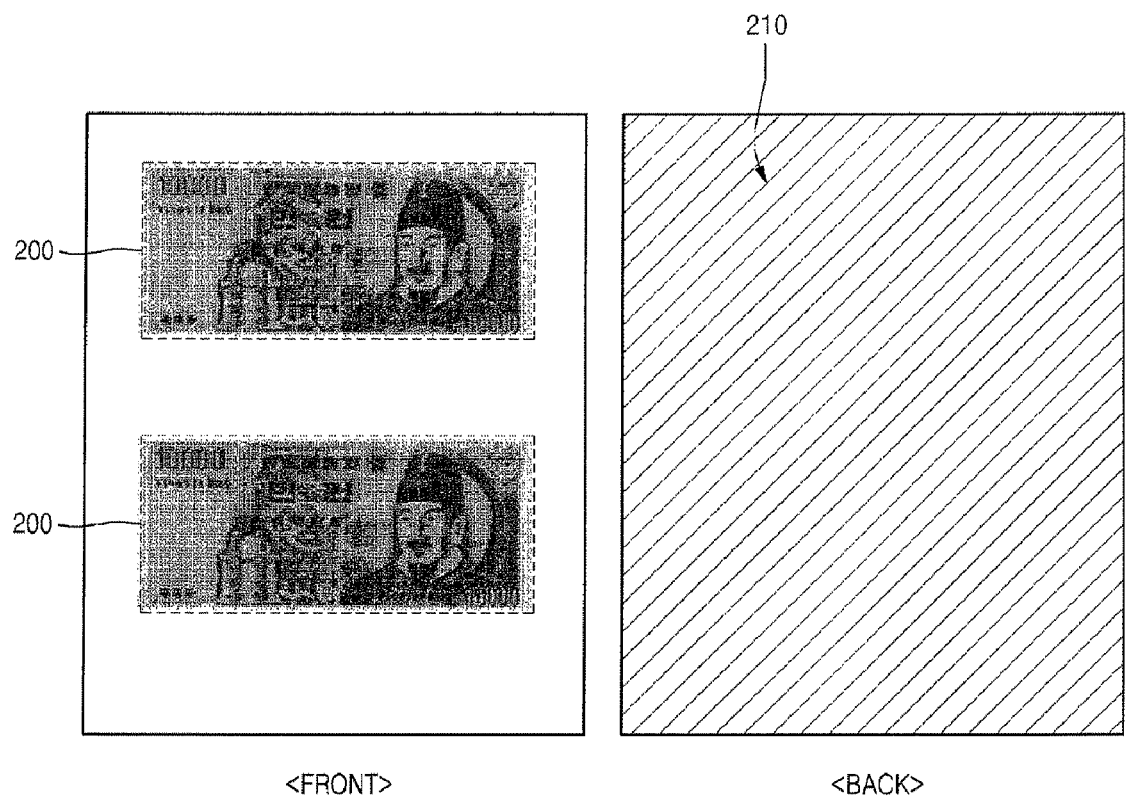
FIG. 4 illustrates a pattern of discriminating counterfeit money, the pattern being printed on the back of the copy of the money, according to an embodiment of the present general inventive concept.
Figure 5:
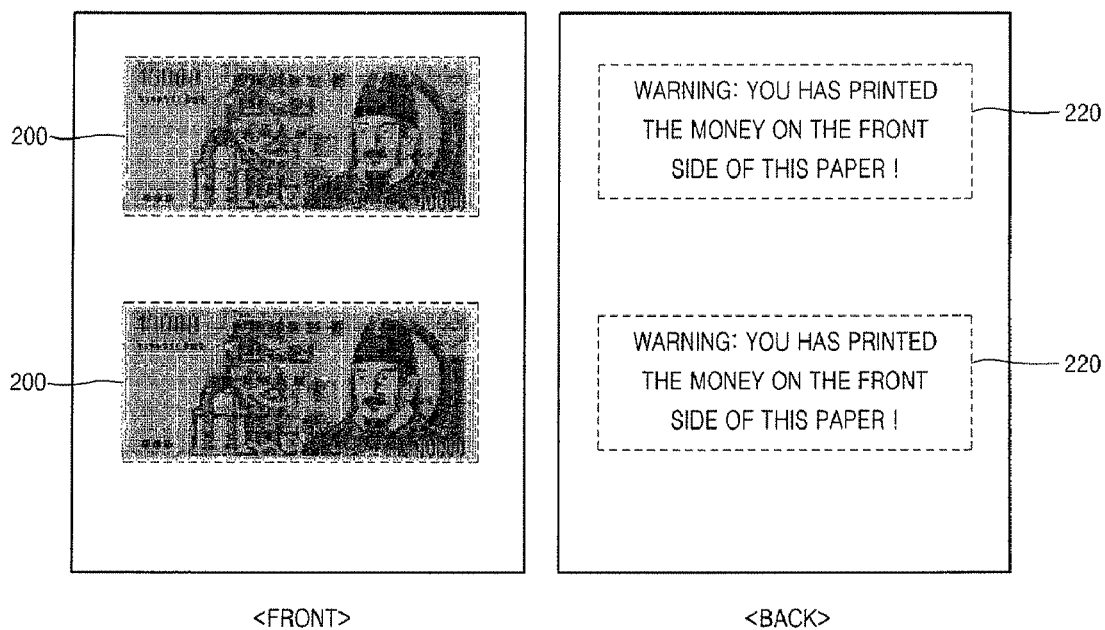
FIG. 5 illustrates a warning message printed on the back of the copied money of FIG. 4, instead of the pattern of discriminating the counterfeit money, according to an embodiment of the present general inventive concept.
Figure 6:
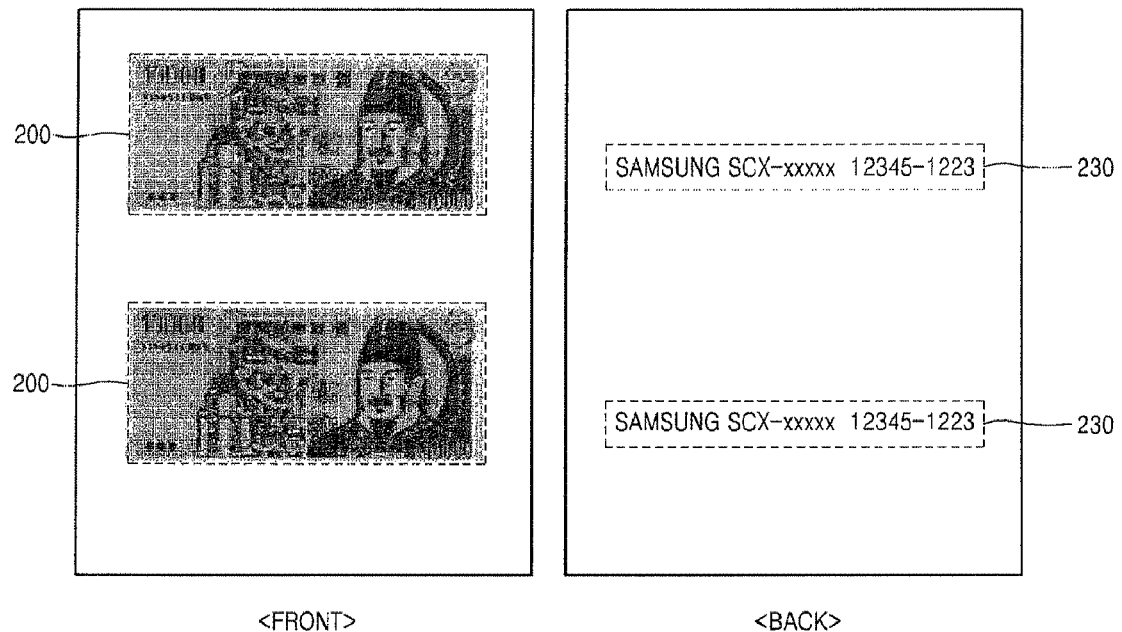
FIG. 6 illustrates a unique number of the image forming apparatus, the unique number being printed on the back of the copied money of FIG. 4 instead of the counterfeit-money discrimination pattern, according to an embodiment of the present general inventive concept.
Figure 7:
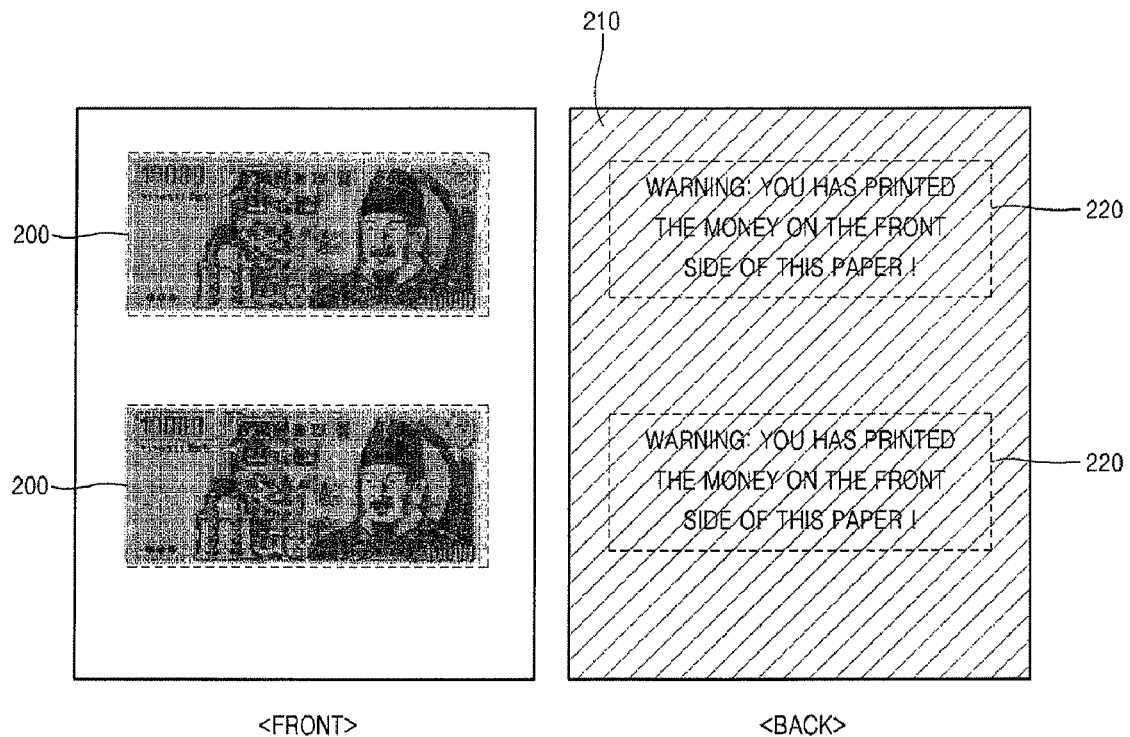
FIG. 7 illustrates the counterfeit-money discrimination pattern and the warning message which are simultaneously printed on the back of the copied money of FIG. 4, according to an embodiment of the present general inventive concept.
Figure 8:
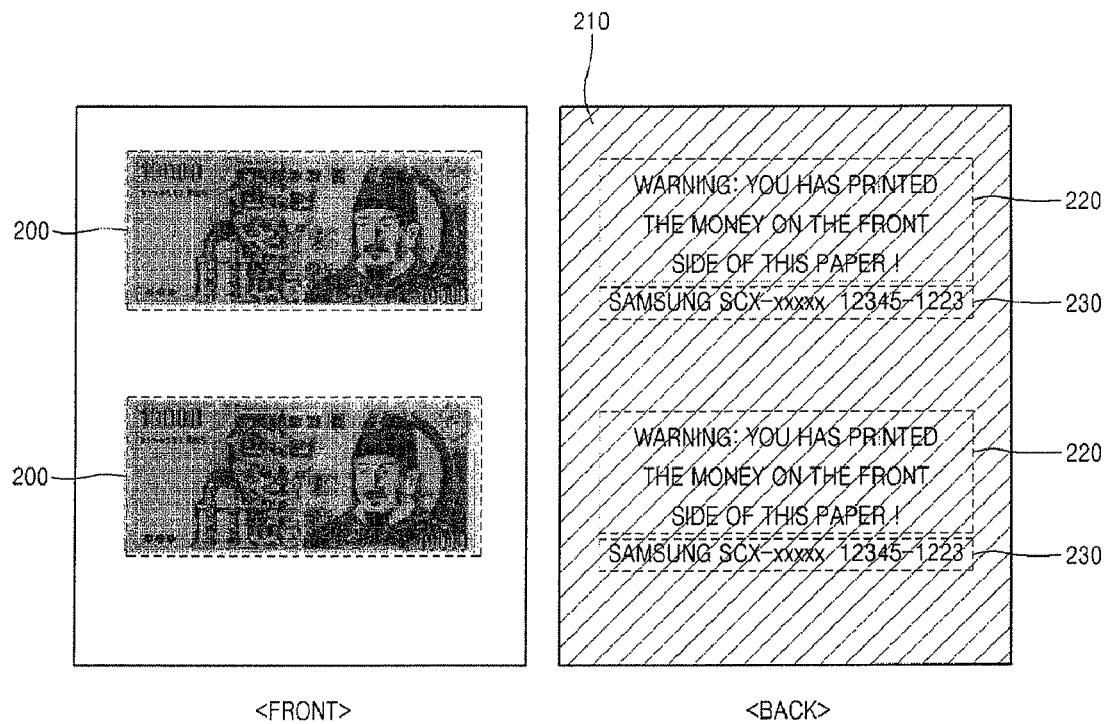
FIG. 8 illustrates the counterfeit-money discrimination pattern, the warning message, and the unique number which are simultaneously printed on the back of the copied money of FIG. 4, according to an embodiment of the present general inventive concept.

FIG. 4 illustrates a pattern of discriminating counterfeit money, the pattern being printed on the back of a copy of the money according to the present general inventive concept. FIG. 5 illustrates a warning message printed on the back of the copy of the money of FIG. 4, instead of the pattern of discriminating the counterfeit money, according to an embodiment of the present general inventive concept. FIG. 6 illustrates a unique number of the image forming apparatus, the unique number being printed on the back of the copy of the money of FIG. 4 instead of the counterfeit-money discrimination pattern, according to an embodiment of the present general inventive concept. FIG. 7 illustrates the counterfeit-money discrimination pattern and the warning message which are simultaneously printed on the back of the copy of the money of FIG. 4, according to an embodiment of the present general inventive concept. FIG. 8 illustrates the counterfeit-money discrimination pattern, the warning message, and the unique number which are simultaneously printed on the back of the copy of the money of FIG. 4, according to an embodiment of the present general inventive concept.

The original image 200 of the object money is printed on the front side of the copy of the money without any change. Counterfeit-money discrimination information configured in the form of a single or combined structure is printed on the back side of the copy of the money. As can be seen from FIG. 4, the counterfeit-money preventing pattern 210 (e.g., an oblique-lined part) may be printed on the back side of the copy of the money. As can be seen from FIG. 5, a warning message 220 (e.g., You have printed the money on the front side of this paper!) may be printed on the back side of the copy of the money, instead of the counterfeit-money preventing pattern 210. As can be seen from FIG. 6, a unique number 230 (e.g., "Samsung SCX-xxxxx 12345-1223") of the image forming apparatus may be printed on the back side of the copy of the money. As can be seen from FIG. 7, the counterfeit money discrimination pattern 210 and the warning message 220 may be simultaneously printed on the back side of the copied money. As can be seen from FIG. 8, the counterfeit money discrimination pattern 210, the warning message 220, and the unique number 230 may be simultaneously printed on the back side of the copy of the money.

As is apparent from the above description, the image forming apparatus according to the various embodiment of the present general inventive concept determines whether the object money to be printed is real money. If the object money is the real money, the image forming apparatus can print a variety of counterfeit money discrimination information (e.g., the counterfeit money preventing pattern, the warning message, or the unique number of the image forming apparatus used for printing the money) on the back side of a copy of the money, and can print the original image of the object money on the front side of the copy of the money without any change. Therefore, the image forming apparatus can color-print the original image of the money without any change, and can prevent the copied money from being used as counterfeit money.

Although a few embodiments of the present general inventive concept have been shown and described, it would be appreciated by those skilled in the art that changes may be made in these embodiments without departing from the principles and spirit of the general inventive concept, the scope of which is defined in the appended claims and their equivalents.

What is claimed is:

1. A method of controlling an image forming apparatus comprising:
   determining whether an object to be printed is money or another type of object;
   if the object is determined to be money, switching to a double-sided printing mode; and
   during the double-sided printing mode, printing counterfeit-money discrimination information on one side of a recording medium, and printing an image of the money on the other side of the recording medium.

2. The method according to claim 1, wherein the printing operation includes:
   firstly performing a printing process on a specific side selected from among front and back sides of the recording medium, in which the specific side includes the counterfeit-money discrimination information.

3. The method according to claim 2, wherein the printing operation includes:
   printing an original image of the money without any change in size.

4. The method according to claim 1, wherein the printing operation includes:
   sequentially printing the counterfeit-money discrimination information and the image of the money.

5. The method according to claim 1, wherein the money is indicative of a bill, a check, paper money, or a security.

6. The method according to claim 1, wherein the counterfeit-money discrimination information is indicative of either a predetermined counterfeit-money preventing pattern, a warning message, and a unique number of the image forming apparatus used for the printing, or is indicative of a combination of the counterfeit money preventing pattern, the warning message, and the unique number of the image forming apparatus.

7. An image forming apparatus comprising:
   a discrimination unit to determine whether an object to be printed is money or another type of object;
   a printing unit to print data, and output the printed data; and
   a controller to control operations of the printing unit if the object to be printed is determined to be money, such that the printing mode is switched to the double-sided printing mode when the object is indicative of money, counterfeit-money discrimination information is printed on either a front side or a back side of a recording medium, and then an image of the money is printed on the other side of the recording medium in such a way that the counterfeit-money discrimination information and the money image are sequentially printed on the recording medium.

8. The apparatus according to claim 7, wherein the money is indicative of a bill, a check, paper money, or a security.

9. The apparatus according to claim 7, wherein the counterfeit-money discrimination information is indicative of either a counterfeit-money preventing pattern indicating that a copied money is counterfeit money, a warning message, and a unique number of the image forming apparatus used for the printing, or is indicative of a combination of the counterfeit money preventing pattern, the warning message, and the unique number of the image forming apparatus.

10. The apparatus according to claim 7, wherein the controller firstly performs a printing process on a specific side selected from among front and back sides of the paper, in which the specific side includes the counterfeit-money discrimination information.

11. The apparatus according to claim 10, wherein the controller prints an original image of the money without any change in size.

12. The apparatus according to claim 7, wherein the controller sequentially prints the counterfeit-money discrimination information and the image of the money.

13. A counterfeit determination apparatus, comprising:
    a discrimination unit to determine whether an object to be printed is money or another type of object; and
    a controller to control operations of reproducing the object if the object is determined to be money, such that a reproducing mode is switched to the double-sided reproducing mode when the object is indicative of money, counterfeit-money discrimination information is provided on either a front side or a back side of a reproduced image, and then an image of the money is printed on the other side of the reproduced image in such a way that the counterfeit-money discrimination information and the money image are sequentially provided on the reproduced image.

14. The counterfeit determination apparatus of claim 13, further comprising:
    a printing unit to print data such that the reproduced image by the controller is reproduced on a recording medium.

15. The counterfeit determination apparatus of claim 13, wherein the reproduced image is reproduced on an image display.

* * * * *